R. B. PATTERSON, Jr.
APPLIANCE FOR MOUNTING AND DEMOUNTING SPLIT PULLEYS.
APPLICATION FILED MAR. 31, 1915.
1,196,884.
Patented Sept. 5, 1916.
2 SHEETS—SHEET 2.
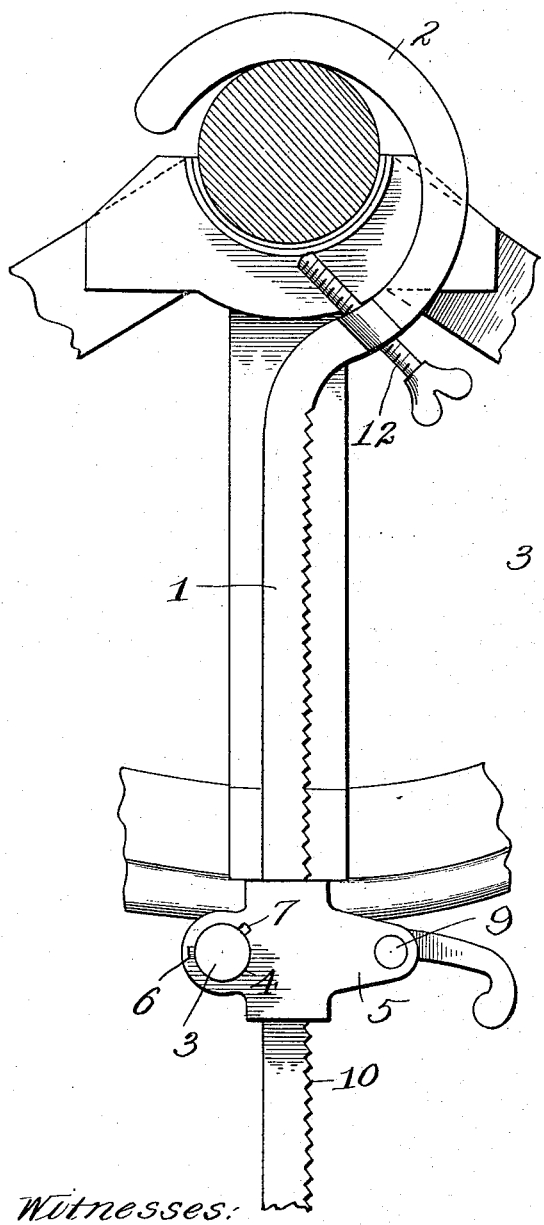
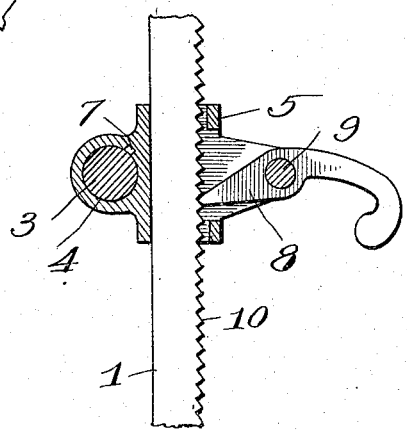
Inventor:
Richard B. Patterson Jr.

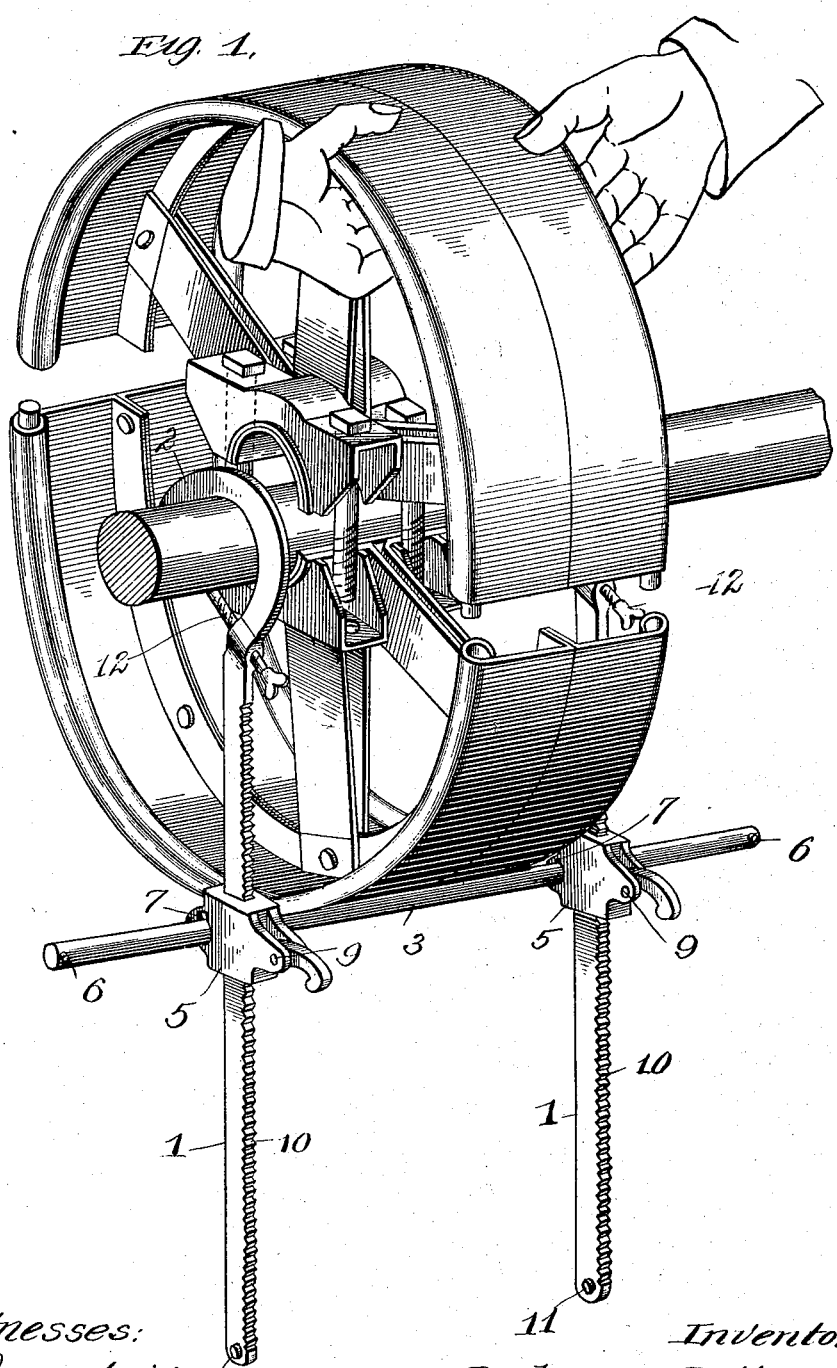

UNITED STATES PATENT OFFICE.

RICHARD B. PATTERSON, JR., OF CHICAGO, ILLINOIS, ASSIGNOR TO ARMSTRONG BROS. TOOL COMPANY, OF CHICAGO, ILLINOIS, A CORPORATION OF ILLINOIS.

APPLIANCE FOR MOUNTING AND DEMOUNTING SPLIT PULLEYS.

1,196,884.      Specification of Letters Patent.      Patented Sept. 5, 1916.

Application filed March 31, 1915. Serial No. 18,323.

*To all whom it may concern:*

Be it known that I, RICHARD B. PATTERSON, Jr., a citizen of the United States, residing at Chicago, in the county of Cook and State of Illinois, have invented a certain new and useful Appliance for Mounting and Demounting Split Pulleys, of which the following is a specification.

In placing a split pulley upon an overhead shaft, it has heretofore been necessary for one workman to support one section of the pulley in contact with the lower side of the shaft, while another workman laid the other section of the pulley upon the shaft and bolted the two sections together, both men standing upon scaffolds or ladders. It will be evident that this operation involved considerable danger to life and limb, particularly when the larger sizes of pulleys were being handled. Similarly, two men were required in removing a split pulley from an overhead shaft.

The object of this invention is to provide an appliance by means of which the operation of mounting or demounting a split pulley may be conveniently, expeditiously and safely performed by one man.

In the accompanying drawings, Figure 1 is a perspective view illustrating the use of my appliance in mounting or demounting a pulley. Fig. 2 is a fragmental view looking in the direction of the shaft. Fig. 3 is a fragmental sectional view showing certain details of construction.

The embodiment herein shown of my invention comprises two bars 1 having hooked upper ends 2 by means of which the bars may be suspended from the shaft on which the pulley is to be placed or from which the pulley is to be removed. The bars 1 carry a rod 3 upon which one of the halves of the pulley may be supported. Said rod is herein shown as extending slidably through openings 4 in two slides 5, which slides are movable longitudinally of the bars 1. It will be seen that the bars 1 may, if desired, be placed upon the shaft at various distances apart, depending upon the width of the face of the pulley.

6 are stop pins set in the ends of the rod 3 to limit the separating movement of the slides 5. In order that the appliance may be taken apart and shipped or stored in small compass, the slides 5 are provided with grooves 7 communicating with the openings 4, said grooves being adapted for the passage of the stop pins 6, thus permitting the rod 3 to be separated from the slides.

Any suitable means may be provided for preventing accidental downward movement of the rod 3 with relation to the bars 1. Herein I have shown dogs 8 which are pivoted at 9 upon the slides 5, said dogs being adapted to engage teeth 10 formed in the adjacent edge of the bars 1. The outer end of the dogs 8 are weighted so as normally to hold the dogs in operative position.

11 are stop pins to retain the slides 5 upon the bars 1.

Normally the slides 5 are freely movable upwardly on the bars 1. In order, however, to prevent the bars 1 from being disengaged from the shaft through being raised with the rod 3 in case anything should interfere with the free upward movement of the slides, I provide for each bar 1 a locking screw 12 arranged near the upper end of the bar and adapted to be advanced into position close to or in contact with the lower side of the shaft.

The method of using the appliance is as follows: When a split pulley is to be placed upon a shaft, the workman hangs the appliance upon the shaft, the bars 1 being located at opposite sides of the place where the pulley is to be secured. The workman then takes one section of the pulley and places said section upon the rod 3. While holding the section upon the rod, he moves the rod upwardly on the bars 1 until the hub of the pulley section is in contact with the lower side of the shaft. The pulley section is thereby securely supported in place. The workman then descends to the floor, takes the other section of the pulley, ascends to the shaft, lays said other pulley section upon the shaft and bolts the two sections rigidly together. The workman then disengages the dogs 8 from the teeth 10 and lowers the rod 7 sufficiently to permit the hooked end of the bars 1 to be removed from the shaft.

In removing a split pulley from a shaft, the appliance is suspended upon the shaft, the rod 3 is moved up close to the lower half of the pulley, the bolts that unite the two pulley sections are removed, and the upper section lifted off and laid aside. The lower section may now be removed from between the shaft and the rod 3 by revolving said section until the hub portion thereof is at the side of the shaft, whereupon the pulley section may be withdrawn laterally from between the shaft and the rod 3, and laid aside. The appliance may then be unhooked from the shaft and, if desired, the rod 3 may be disconnected from the slides 5 so that the appliance may be stored in a small space.

It will be seen that the vertically adjustable rod 3 provides for the handling of pulleys of various diameters; that the bars 1 may be moved toward or away from each other to accommodate pulleys of different widths; and that the appliance and the pulley supported thereby may be slid longitudinally of the shaft, if necessary, in order to line up the pulley with the driven pulley.

While the present embodiment of the invention has been described with considerable particularity, it will be understood that the invention is not limited to the construction illustrated and described, but that, on the contrary, various modifications may be made within the scope of the appended claims.

I claim as my invention:

1. An appliance for mounting and demounting split pulleys comprising a member for supporting a pulley section while being placed in or removed from operative position on its shaft, and means for maintaining said supporting member in operative position.

2. An appliance for mounting and demounting split pulleys comprising a member for supporting a pulley section while being placed in or removed from operative position on its shaft, and means whereby said supporting member may be suspended from said shaft.

3. In an appliance for mounting and demounting split pulleys, two bars having hooked ends adapted to engage a shaft, and means carried by said bars to support a pulley section.

4. In an appliance for mounting and demounting split pulleys, two bars having hooked ends adapted to engage a shaft, and vertically adjustable means carried by said bars for supporting a pulley section.

5. In an appliance for mounting and demounting split pulleys, two bars having hooked ends adapted to engage a shaft, and a pulley-supporting member adjustable vertically of said bars, said bars being adjustable horizontally along said member.

6. Two vertical supporting bars, a slide on each bar, means to prevent downward movement of said slides, and a member carried by said slides for supporting a pulley section.

7. In an appliance for mounting and demounting split pulleys, two vertical supporting bars, a slide on each bar, said bars having teeth, a dog on each slide to engage said teeth to lock the slide against downward movement, and means carried by said slides for supporting a pulley section.

8. In an appliance for mounting and demounting split pulleys, two bars having hooked ends adapted to engage a shaft, screws carried by said bars near their upper ends and adapted to engage the shaft, and means carried by said bars for supporting a pulley section.

In testimony whereof, I hereunto set my hand in the presence of two witnesses.

RICHARD B. PATTERSON, Jr.

In the presence of—
GEORGE L. CHINDAHL,
MARGARET H. MANN.

Copies of this patent may be obtained for five cents each, by addressing the "Commissioner of Patents, Washington, D. C."